US011475544B2

(12) United States Patent
Gupta et al.

(10) Patent No.: US 11,475,544 B2
(45) Date of Patent: Oct. 18, 2022

(54) AUTOMATED BRACES REMOVAL FROM IMAGES

(71) Applicant: ADOBE INC., San Jose, CA (US)

(72) Inventors: Angad Kumar Gupta, Uttar Pradesh (IN); Sourabh Gupta, Uttar Pradesh (IN)

(73) Assignee: Adobe Inc., San Jose, CA (US)

( * ) Notice: Subject to any disclaimer, the term of this patent is extended or adjusted under 35 U.S.C. 154(b) by 95 days.

(21) Appl. No.: 17/072,241

(22) Filed: Oct. 16, 2020

(65) Prior Publication Data

US 2022/0122231 A1    Apr. 21, 2022

(51) Int. Cl.
| | |
|---|---|
| *G06T 5/00* | (2006.01) |
| *G06T 11/40* | (2006.01) |
| *G06K 9/62* | (2022.01) |
| *G06T 7/11* | (2017.01) |
| *A61C 7/00* | (2006.01) |
| *A61C 13/00* | (2006.01) |
| *G06V 40/16* | (2022.01) |

(52) U.S. Cl.
CPC ............ *G06T 5/005* (2013.01); *G06K 9/6223* (2013.01); *G06K 9/6256* (2013.01); *G06T 5/002* (2013.01); *G06T 7/11* (2017.01); *G06T 11/40* (2013.01); *G06V 40/171* (2022.01); *G06T 2200/24* (2013.01); *G06T 2207/20156* (2013.01); *G06T 2207/30201* (2013.01)

(58) Field of Classification Search
CPC combination set(s) only.
See application file for complete search history.

(56) References Cited

U.S. PATENT DOCUMENTS

| | | | |
|---|---|---|---|
| 2019/0159868 A1* | 5/2019 | Chen | A61C 9/006 |
| 2020/0015936 A1* | 1/2020 | Ye | A61C 7/023 |
| 2020/0022784 A1* | 1/2020 | Sherwood | G16H 30/20 |
| 2020/0183969 A1* | 6/2020 | Wiesel | G06T 7/11 |
| 2020/0237486 A1* | 7/2020 | Kopelman | G06V 40/171 |

\* cited by examiner

*Primary Examiner* — Wesner Sajous
(74) *Attorney, Agent, or Firm* — Shook, Hardy & Bacon L.L.P.

(57) ABSTRACT

Methods and systems are provided for facilitating automated braces removal from individuals in images. In embodiments described herein, an indication to remove the braces from an individual wearing braces in an image is obtained. Based on receiving the indication to remove the braces, automatically, without user intervention, a teeth region is identified in the image that includes teeth of the individual, and a braces region is identified that includes braces visible in the teeth region. The teeth region and braces region are used to generate an edited image that includes the individual without braces.

20 Claims, 13 Drawing Sheets

AUTOMATED BRACES REMOVAL FROM IMAGES

BACKGROUND

Oftentimes, individuals captured in pictures have braces on their teeth. In some cases, however, individuals prefer not to show braces and, as a result, may keep their mouth closed to avoid capturing braces in the picture or may even avoid the picture altogether. In other cases, an individual may prefer to remove any visible braces in an image. Editing an image to remove braces, however, is a tedious and time consuming process. In particular, an editor generally performs multiple steps for each tooth to remove braces. Such manual editing is time intensive and often does not result in a desired natural appearance.

SUMMARY

Accordingly, embodiments of the present disclosure are directed to facilitating automated braces removal from individuals in images. In this regard, braces on teeth of an individual in an image are automatically removed from the image. In embodiments, such an automated removal of braces can be initiated based on a user selection (e.g., single selection) to remove braces of an individual(s) within the image. As such, based on a user selection to remove braces, the braces are automatically removed from the image. In particular, a set of operations are automatically performed, via an automatic braces removal system, to identify a braces region and remove and fill the braces region from the image. As such, the image does not need to manually remove braces from each tooth via painting and blending colors for each tooth and gum portion. Advantageously, using an automated braces removal approach to remove braces from an individual in an image is efficient and provides natural-looking results.

DETAILED DESCRIPTION

Oftentimes, individuals captured in images are wearing braces. Many individuals, however, would prefer to remove the braces from the image. Currently, removing braces using an image editing application is a very tedious task. In particular, various operations using various tools need to be performed to remove the braces, with each operation being initiated by a user. For example, a user may sample colors of the tooth and then paint over top of the braces via a brush tool. When colors shift, a new sample color needs to be used to paint over top of the braces. As many different colors may be used, the editor can blend the colors of the tooth together to obtain a more unified tooth. This manual image editing process can continue until a desired braces removal is achieved. As braces are generally removed from multiple tooth and gum portions, such a manual process can be tedious and inefficient. Further, such a manual process may not result in as realistic or as natural as desired by an editor.

Accordingly, embodiments of the present disclosure are directed to facilitating automated braces removal from individuals in images. In this regard, for an image being edited, braces on teeth of an individual are automatically removed from the image. In embodiments, such an automated removal of braces can be initiated based on a user selection (e.g., single selection) to remove braces of an individual(s) within the image. In accordance with the user selection to remove braces, the braces are automatically removed from the image (without further user input). That is, a set of operations are automatically performed to identify a braces region and remove and fill the braces region from the image. As such, an editor does not need to manually remove braces from each tooth via painting and blending colors for each tooth and gum portion.

Figure 1:
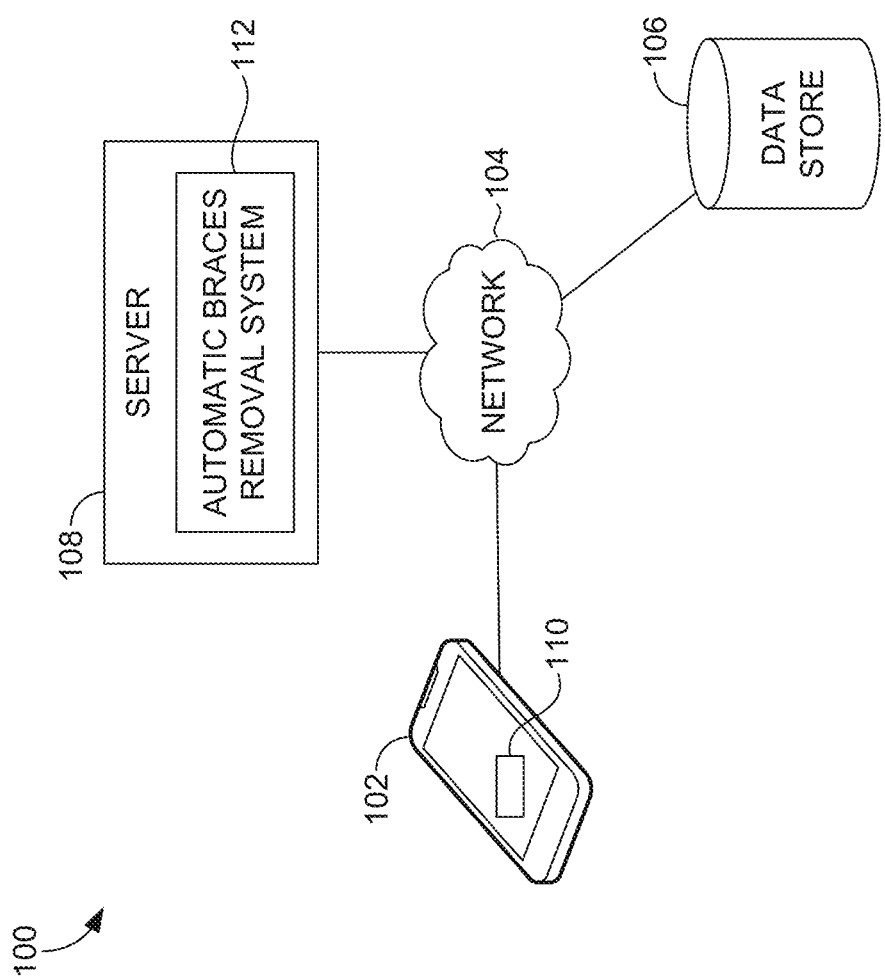
FIG. 1 depicts a diagram of an environment in which one or more embodiments of the present disclosure can be practiced, in accordance with various embodiments of the present disclosure.

Turning to FIG. 1, FIG. 1 depicts an example configuration of an operating environment 100 in which some implementations of the present disclosure can be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 12.

It should be understood that operating environment 100 shown in FIG. 1 is an example of one suitable operating environment. Among other components not shown, operating environment 100 includes a user devices, such as user device 102, network 104, a data store 106, and a server(s) 108. Each of the components shown in FIG. 1 may be implemented via any type of computing device, such as one or more of computing device 1200 described in connection to FIG. 12, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other components may be employed within operating environment 100 within the scope of the present disclosure. Each may comprise a single device or multiple devices cooperating in a distributed environment.

User device 102 can be any type of computing device capable of being operated by a user. For example, in some implementations, user device 102 is the type of computing device described in relation to FIG. 12. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user device 102 can include one or more processors, and one or more computer-readable media. The computer-readable media may include computer-readable instructions executable by the one or more processors. The instructions may be embodied by one or more applications, such as application 110 shown in FIG. 1. Application 110 is referred to as a single application for simplicity, but its functionality can be embodied by one or more applications in practice. As indicated above, the other user devices can include one or more applications similar to application 110.

The application(s) may generally be any application capable of facilitating automated braces removal (e.g., via the exchange of information between the user devices and the server(s) 108). In some implementations, the application(s) comprises a web application, which can run in a web browser, and could be hosted at least partially on the server-side of environment 100. In addition, or instead, the application(s) can comprise a dedicated application, such as an application having image processing functionality. In some cases, the application is integrated into the operating system (e.g., as a service). It is therefore contemplated herein that "application" be interpreted broadly.

In accordance with embodiments herein, the application 110 can facilitate automated braces removal via a set of operations initiated, for example, based on a user selection. In embodiments, braces can be removed from a face (teeth) of an individual in an image in an automated manner such that an image editor automatically initiates multiple operations to effectuate braces removal. As can be appreciated, braces may be removed from any number of individuals in an image. For example, if three individuals in an image have braces, the braces can be removed from each of the three individuals in an automated manner.

In operation, a user can select or input an image or picture for which editing is desired. For instance, a user may select a desired image from a repository, for example, stored in a data store accessible by a network or stored locally at the user device 102. As another example, a user may take a picture using a camera on a device, for example, user device 102, for which a editing or image correction is desired. Although described as a user selecting an image, an image may be automatically selected (e.g., based on detection of braces in an image, based on a default setting to automatically remove braces in images, etc.). In this regard, automated braces removal may be provided for images for which editing is not necessarily desired. For example, an image being viewed by a user may be automatically edited to remove braces from an individual in the image even if the user did not initially intend or desire to edit the image to remove the braces from the individual.

Based on an image having an individual or face with braces, the braces can be removed from the individual in an automated manner. In this regard, an individual having braces within an initial image is edited to generate an edited image with the braces appearing removed from the individual. The edited image with the individual(s) having the braces that appear removed can be displayed via the application 110 of the user device. The edited image with the braces removed from an individual(s) can be presented in any manner. As one example, a braces-free edited image may be presented as a preview. The edited image, with the braces removed, can be stored, shared, displayed, etc.

As described herein, server 108 can facilitate performing removal of braces via automatic braces removal system 112. Server 108 includes one or more processors, and one or more computer-readable media. The computer-readable media includes computer-readable instructions executable by the one or more processors. The instructions may optionally implement one or more components of automatic braces removal system 112, described in additional detail below with respect to automatic braces removal system 202 of FIG. 2. At a high level, automatic braces removal system 112 manages automated braces removal. To effectuate a removal of braces from an individual in an image, the automatic braces removal system 112 identifies the braces within an image and effectively removes the braces by filling the braces region with an appropriate tooth and/or gums color. The braces removal is performed automatically, that is, manual steps by the user of filling in braces and blending colors is avoided. Rather, the user can, for example, simply select a "braces removal" button and have the braces in the image automatically removed by the automatic braces removal system 112. Furthermore, the automatic braces removal can be performed on multiple sets of teeth in a single digital still image, as well as in multiple different images in a collection of digital still images or frames of digital video.

For cloud-based implementations, the instructions on server 108 may implement one or more components of automatic braces removal system 112, and application 110 may be utilized by a user to interface with the functionality implemented on server(s) 108. In some cases, application 110 comprises a web browser. In other cases, server 108 may not be required. For example, the components of automatic braces removal system 112 may be implemented completely on a user device, such as user device 102. In this case, automatic braces removal system 112 may be embodied at least partially by the instructions corresponding to application 110.

Thus, it should be appreciated that automatic braces removal system 112 may be provided via multiple devices arranged in a distributed environment that collectively provide the functionality described herein. Additionally, other components not shown may also be included within the distributed environment. In addition, or instead, automatic braces removal system 112 can be integrated, at least partially, into a user device, such as user device 102. Furthermore, automatic braces removal system 112 may at least partially be embodied as a cloud computing service.

Figure 2:
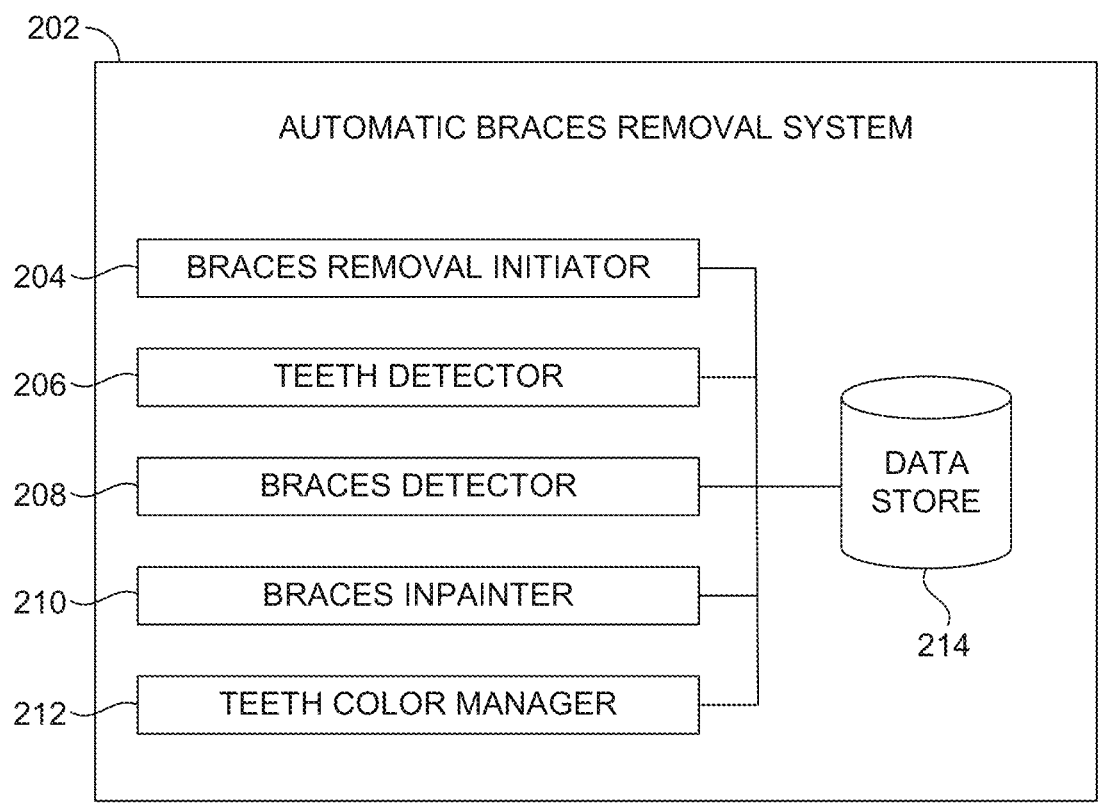
FIG. 2 depicts an example configuration of an operating environment in which some implementations of the present disclosure can be employed, in accordance with various embodiments of the present disclosure.

Referring to FIG. 2, aspects of an illustrative automatic braces removal system are shown, in accordance with various embodiments of the present disclosure. Automatic braces removal system 202 includes a braces removal initiator 204, a teeth detector 206, a braces detector 208, a braces inpainter 210, a teeth color manager 212, and a data store 214. The foregoing components of automatic braces removal system 202 can be implemented, for example, in operating environment 100 of FIG. 1. In particular, those components may be integrated into any suitable combination of user devices 102 and/or server(s) 108 of FIG. 1.

Data store 214 can store computer instructions (e.g., software program instructions, routines, or services), data, and/or models used in embodiments described herein. In some implementations, data store 214 stores information or data received or generated via the various components of automated braces removal system 202 and provides the various components with access to that information or data, as needed. Although depicted as a single component, data store 214 may be embodied as one or more data stores. Further, the information in data store 214 may be distributed in any suitable manner across one or more data stores for storage (which may be hosted externally).

In embodiments, data stored in data store 214 includes image data. Image data generally refers to data in association with performing braces removal. As such, image data can include data associated with pre-edited images (e.g., images before braces removal operations are performed), edited images (e.g., images after braces removal operations are performed), masks, and the like. In this regard, data store 214 can be used to store various types of image data as described in more detail below.

The braces removal initiator 204 is generally configured to initiate braces removal in association with an individual(s) in an image(s). To initiate removal of braces, the braces removal initiator 204 can receive or otherwise obtain or access an image for which to remove braces. An image for which to remove braces can be obtained from any source. For example, an image may be obtained from a user device or accessed from another repository or data storage.

In some cases, an image for which to initiate braces removal may be automatically obtained. For example, an application, such as application 110 of FIG. 1, may include a default setting that automatically removes braces from individuals in images. In such cases, images including individuals, or faces, with braces can be automatically identified and obtained for braces removal image processing. As braces removal associated with a subject(s) in an image is desired, images without any individual's face may be excluded from being identified for performing braces removal.

Alternatively or additionally, the braces removal initiator 204 may facilitate selection of an image, and/or individuals associated therewith, for which to perform braces removal. In particular, a user can select or input an image for which braces removal is desired. In this regard, a user may interact with an application, such as application 110 of FIG. 1, via a graphical user interface, to select one or more images of interest for performing braces removal. For example, a brace removal icon may be visually presented via a graphical user interface. In accordance with viewing an image, a user may select the brace removal icon to automatically trigger braces removal from one or more individuals in the image. A brace removal control may be visually represented in any number of ways. For instance, a braces removal control may be represented via icons, emoticons, images, text, or the like. As can be appreciated, in some cases, a braces removal control may be presented as a default in association with presenting an image, editing an image, or the like. In such cases, a braces removal control is presented irrespective of whether an individual wearing braces is in the image. In other cases, a braces removal control may be presented upon detection of braces within an image or upon detection of faces or individuals within an image. For example, upon detecting an individual with braces in an image, a braces removal control may be presented via a graphical user interface to enable a user to initiate braces removal (e.g., via a one-touch selection).

Figure 3:
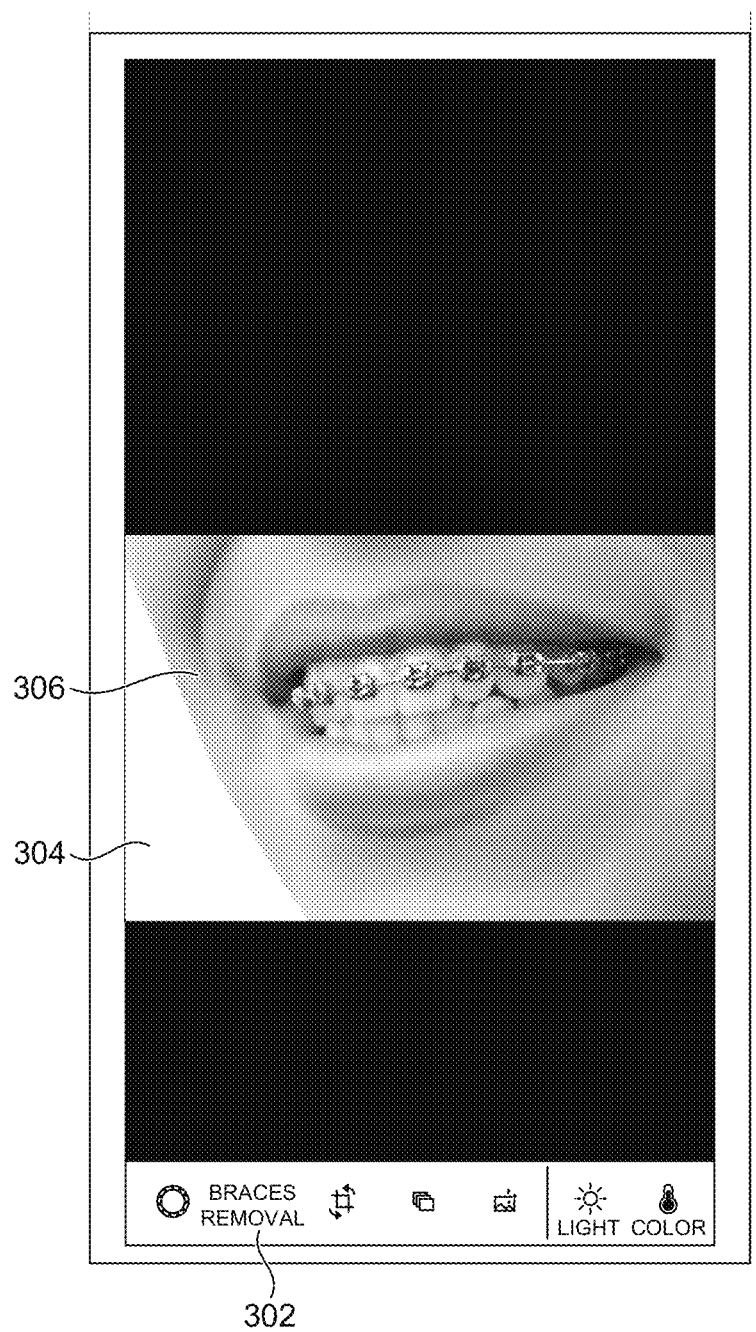
FIG. 3 illustrates one example of a graphical user interface, in accordance with embodiments of the present disclosure.

With reference to FIG. 3, FIG. 3 illustrates one example of initiating brace removal via a single selection by a user. As illustrated in FIG. 3, a brace removal control 302 is illustrated in association with an image 304 being viewed. Assume a user selects the braces removal control 302. In such a case, automated braces removal is initiated in association with individual 306 in the image 304.

In some implementations, the braces removal can be automatically applied to each individual wearing braces in an image. For example, face detection can be applied to identify any faces and, thereafter, each face may be analyzed to identify which, if any, include braces on the teeth of the individual. In other implementations, an individual or set of individuals in the image for which braces removal is desired may be selected (e.g., by a user). For instance, a user may select (e.g., via a selector or a touch motion) pixels or an area that aligns with a particular individual, face, or set of teeth in the image to indicate a desire to perform braces removal in association with that individual(s). As can be appreciated, any threshold for selecting braces to be removed may be implemented. For example, in some cases, selection of an individual mouth or face may be needed to trigger automated braces removal, whereas, in other cases, selection of an individual, or in the vicinity of an individual, may trigger automated braces removal.

In accordance with initiating braces removal with respect to a particular image(s), individual(s), and/or face(s), the teeth detector 206 detects a teeth region associated with a face(s), or individual(s), in an image. To this end, the teeth detector 206 detects a teeth region within a face (e.g., a face detected within an image). A teeth region generally refers to a region or area of an image corresponding with a set of teeth (e.g., human teeth) shown by an individual in the image and that is visible to a viewer of the image. As such, teeth detector 206 can identify each pixel that displays part of the teeth, and only the teeth. In some cases, instance segmentation can be used detect and delineate teeth in an image.

Figure 4A:
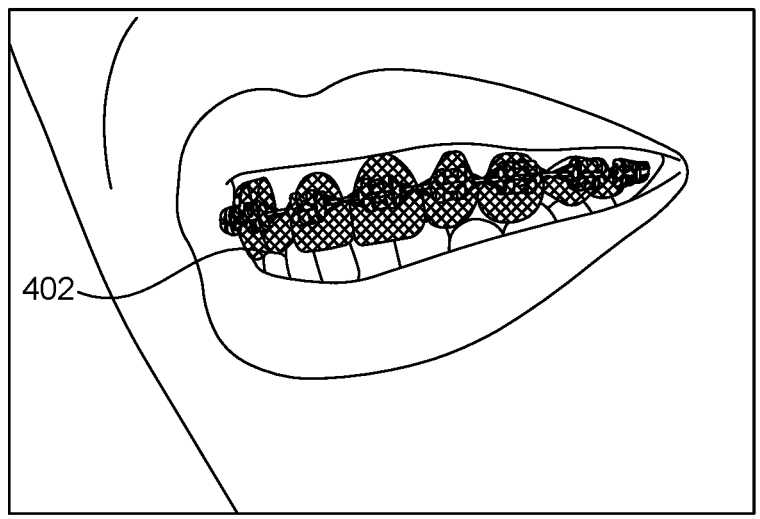
FIG. 4A illustrates an example teeth mask in accordance with embodiments of the present disclosure.

In embodiments, the teeth region is represented via a teeth mask. As such, the teeth detector 206 can generate or output a teeth mask that represents the teeth region. A mask generally refers to an object (i.e., black and white, or grayscale image) that is used to hide portions of an image without actually losing any information and reveal other portions of the image. A teeth mask can be a binary mask that corresponds with a teeth region of a mouth of an individual. One example of a teeth mask 402 is illustrated in FIG. 4A.

To generate a teeth mask, the teeth detector 206 may use or include a machine learning system, which can be implemented using various different machine learning techniques. Machine learning systems refer to a computer representation that can be tuned (e.g., trained) based on inputs to approximate unknown functions. In particular, machine learning systems can include a system that utilizes algorithms to learn from, and make predictions on, known data by analyzing the known data to learn to generate outputs that reflect patterns and attributes of the known data. For instance, a machine learning system can include decision trees, support vector machines, linear regression, logistic regression, Bayesian networks, random forest learning, dimensionality reduction algorithms, boosting algorithms, artificial neural networks, deep learning, and so forth.

As one example, the teeth detector 206 can employ one or more convolutional neural networks to generate a teeth mask. As such, in one or more implementations, machine learning system, such as a Mask region convolutional neural network (R—CNN) can generate a teeth mask. A Mask R-CNN includes multiple fully-convolutional neural networks that receive an image as an input and generate the teeth mask. In some embodiments, the Mask R-CNN is also configured to generate a cropped region of the image where the teeth region is located. Such a cropped region may refer to a bounding box around the teeth mask.

The machine learning system is trained, for example, on a set of training images that include teeth enclosed in a polygon (and, in some embodiments, a bounding box around those teeth). The set of training images can include various images of individuals with braces fully visible, partially visible, broken, missing, dirty, colored teeth, and/or the like. In some implementations, teeth regions may be labeled into free-form polygons, which are used to generate binary masks that are, thereafter, used for training. The machine learning system can be trained, for example, by updating weights of filters in the fully-convolutional network networks of the machine learning system to minimize the loss between the known teeth regions and teeth region bounding boxes for the training images, and the loss between the known teeth regions and the teeth region bounding boxes generated by the machine learning system for the training images.

Figure 4B:
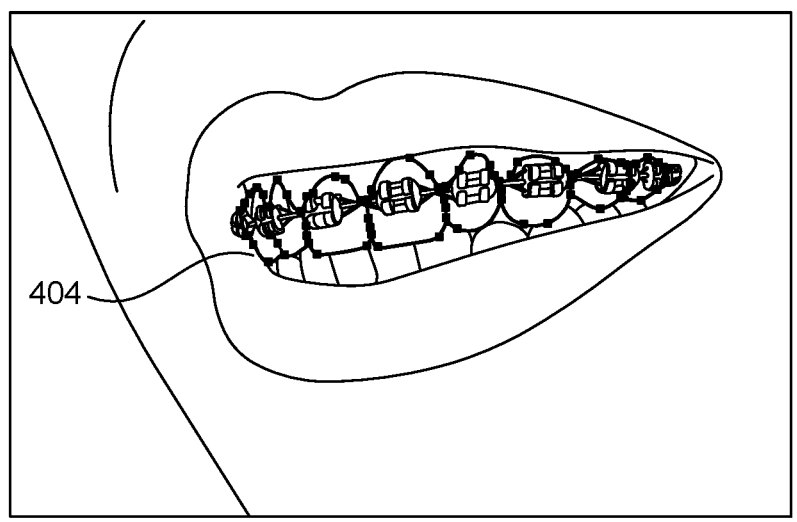
FIG. 4B illustrates example tooth edges, in accordance with embodiments of the present disclosure.

In some embodiments, the teeth detector 206 also detects edges of the teeth. In this regard, the teeth detector 206 can detect edges of individual teeth within each teeth region. For example, a machine learning system can be used to find the visual structure of each tooth in the teeth region as identified by a teeth mask. Generally, the outer layout corresponding to each tooth in the tooth region is detected, which provides the tooth's shape. A tooth segmentation drawing that identifies where each individual tooth is in the teeth region as identified by the teeth mask can be generated. An example of teeth edges 404 is illustrated in FIG. 4B.

The braces detector 208 is generally configured to detect a braces region in an image associated with a face, or individual, in an image. To this end, the braces detector 208 detects a braces region within a face (e.g., a face detected within an image). A braces region generally refers to a region or area of an image corresponding with a set of braces (e.g., on human teeth) shown by an individual in the image and that is visible to a viewer of the image. As such, braces detector 208 generally includes identifying pixels that display part of the braces.

In some embodiments, a braces region may be represented or defined by a braces mask. In such cases, the braces detector 208 can generate or output a braces mask that represents the braces region. A braces mask refers to a mask of the braces that appear in the visible region of the mouth.

As can be appreciated, the braces can lie inside the teeth region (on the teeth) and outside the teeth region (e.g., on gums, gingiva, or inter-teeth gaps). As such, the braces detector 208 may generate a braces region (e.g., represented via a braces mask) that corresponds with a braces region over the teeth (a tooth-braces region) and a braces region over the gums or other non-teeth region (a gums-braces region).

As described, a tooth-braces region generally refers to a braces region that corresponds with braces overlaying the tooth in an image. As such, the braces detector 208 generally detects the braces region within, or in association with, each individual tooth. In particular, the braces detector 208 can utilize the detected teeth region, or mask representation thereof, to detect a braces region within the teeth region.

Figure 5A:
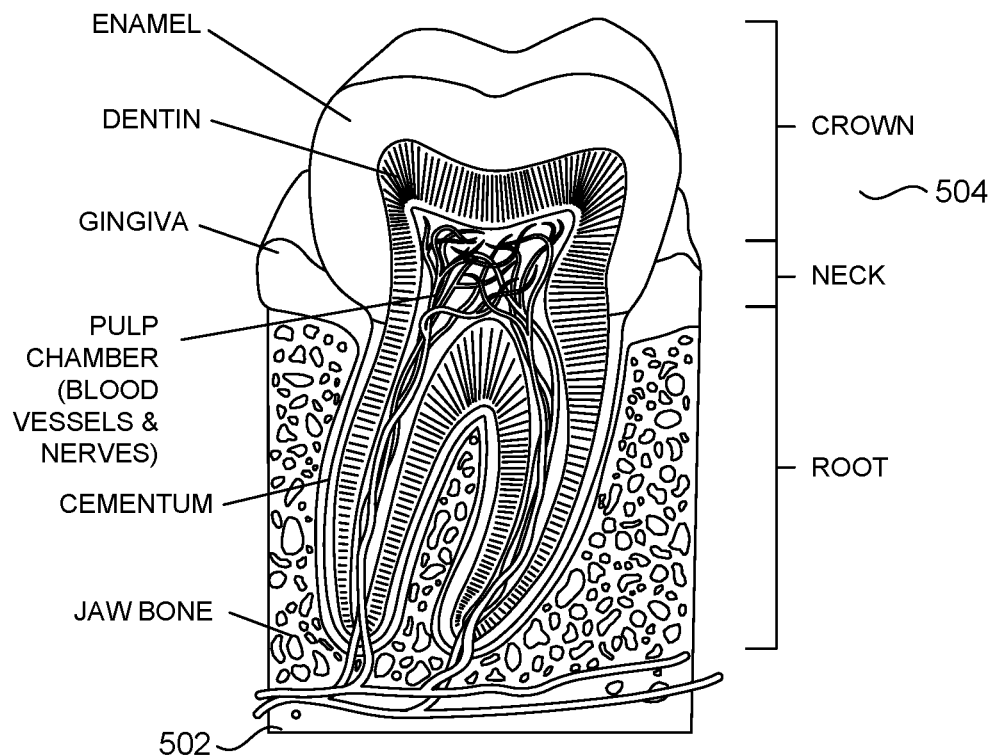
FIG. 5A provides an example tooth structure, in accordance with embodiments of the present disclosure.
Figure 5B:
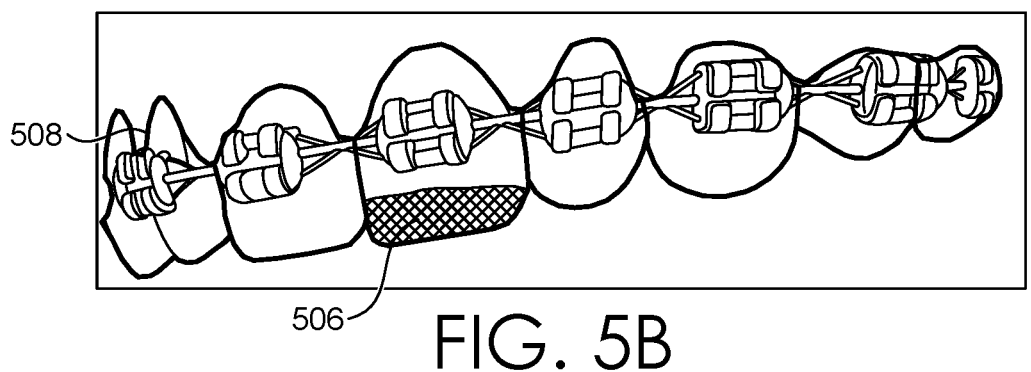
FIG. 5B provides an example crown portion shown on a tooth, in accordance with embodiments of the present disclosure.

To detect the brace region inside a tooth, a sample tooth color can be determined for each tooth and used to differentiate pixels associated with the tooth from pixels associated with braces. A sample tooth color is a color that is a sample of a tooth. Sample tooth color can be determined in any of a number of ways. As one example, a sample tooth color can be determined from the color of a crown portion of each tooth. The crown portion may be extracted from a teeth region (e.g., represented via the teeth mask). The crown portion generally refers to the head region of the tooth or the visible portion that protrudes or extends beyond the gums. FIG. 5A provides an illustration of a tooth structure 502. As shown, the crown 504 is the portion extending furthest from the gums. FIG. 5B illustrates a crown portion 506 shown on a tooth of a set of teeth 508.

The crown portion may be defined in any number of ways. In one example, the crown portion may be a predetermined proportion of a tooth (e.g., $\frac{1}{5}^{th}$ of a tooth height). In another example, the crown portion may be dynamically determined or configured proportion. For example, a crown portion may be configurable depending on size of tooth. For instance, if braces are covering most of a tooth, the crown portion may be reduced to $\frac{1}{10}^{th}$ or $\frac{1}{12}^{th}$ of the head region of the tooth.

Figure 6A:
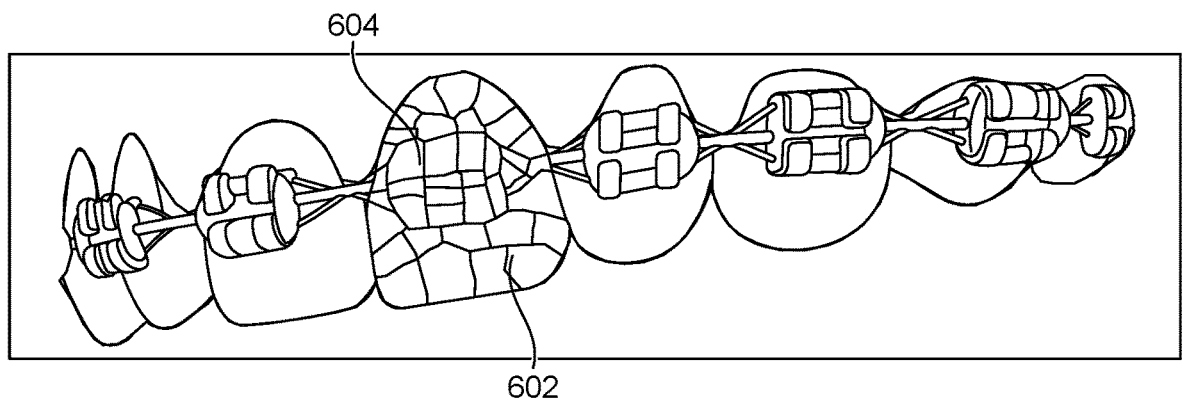
FIG. 6A illustrates a tooth separate into various blocks, according to embodiments of the present disclosure.

To determine the braces region inside the tooth (tooth-braces region), a tooth region can be divided or segmented into blocks. For example, a tooth as defined via tooth edges may be analyzed. As another example, a teeth region as defined via a teeth mask may be analyzed. A block can include a set of pixels having a similar color. To this end, a color-matching algorithm can be used to divide a teeth region (e.g., represented by the teeth mask) into colors. To do so, one approach initially selects seed pixels within the teeth region (e.g., a particular tooth in the teeth region, a set of teeth within the teeth region, or the entire teeth region). Seed pixels may be selected randomly (e.g., in equal distributions) throughout the teeth region, or the like. For each seed pixel, surrounding or nearby pixels are analyzed to identify if such pixels have a similar color. For example, pixel intensity difference may be determined between pixels. If pixel intensity difference between two pixels is less than a threshold, then the pixel is added to the same block. If the pixel intensity difference is not less than the threshold, then a new block is started. Upon analyzing each pixel, the tooth region is be divided into various blocks, with each block including pixels of similar color. For example, FIG. 6A illustrates a tooth divided or separated into various blocks. Each block includes pixels of similar colors. For example, block 602 includes pixels within a threshold of tooth color similarity, and block 604 includes pixels within a threshold of braces color similarity.

Figure 6B:
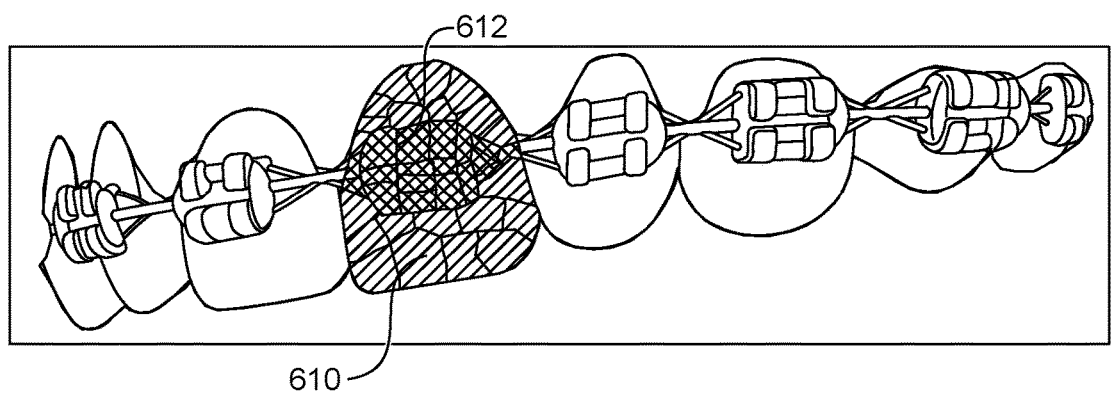
FIG. 6B illustrates blocks segmented into a tooth group and a braces group, according to embodiments of the present disclosure.

The blocks can be separated into two groups or segments, a tooth group or a braces group. The blocks are generally divided or separated based on color proximity, that is, whether the block color matches to tooth region or braces region. In some implementations, to separate the blocks into a tooth group and a braces group, the sample tooth color determined for the crown is compared with each block color (e.g., an average of pixel colors of a block). In cases that the sample tooth color is within a threshold distance to the block color, the block is designated to the tooth group. Otherwise, the block is designated to the braces group. As shown in FIG. 6B, blocks are separated into a tooth group 610 and a braces group 612. Such a block grouping or segmenting can be performed for each visible tooth, or each visible tooth having a braces portion (e.g., using a sample color from the corresponding tooth), within the teeth region.

In an additional or alternative embodiment, the block colors may be compared to a sample braces color. In cases that the braces color is within a threshold distance to the block color, the block is designated to the braces group. Otherwise, the block is designated to the tooth group.

As described, in some cases, a portion of the braces (e.g., braces link, or connectors) may lie outside of the teeth region (e.g., such as on gums or inter-teeth gap). As these portions of braces lie outside of the teeth region, a gums-braces region is determined. A gums-braces region generally refers to a braces region that corresponds with braces overlaying non-tooth regions in an image, such as gums, in-between teeth, or the like.

Figure 7A:
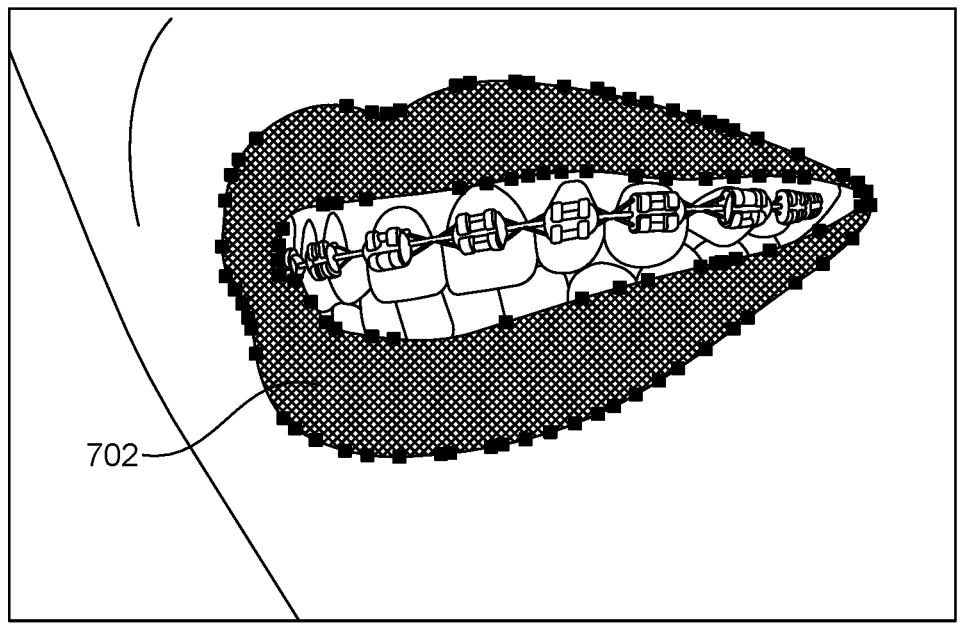
FIG. 7A illustrates an example upper and lower lips mask, according to embodiments of the present disclosure.
Figure 7B:
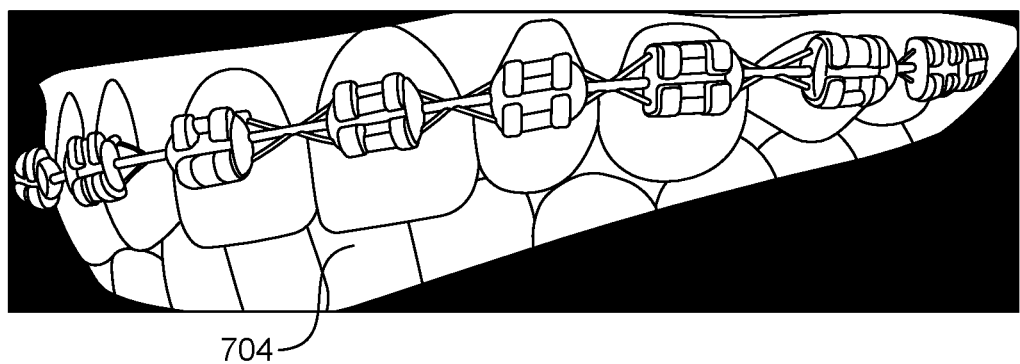
FIG. 7B illustrates an example teeth-and-gums mask, according to embodiments of the present disclosure.

To determine a gums-braces region that reflects braces visible outside the teeth region, in one embodiment, face landmark detection (e.g., TVS landmark) can be run on an individual's face in an image to extract a mask of the mouth (i.e., mouth mask), which includes lips, teeth, etc. as well an upper lips mask and a lower lips mask. The upper and lower lips masks can be removed or subtracted from the mouth mask to obtain a teeth-and-gums mask that represents the teeth and gums region. For example, as illustrated in FIGS. 7A and 7B, an upper and lower lips mask 702 of FIG. 7A is removed from a mouth mask to obtain a teeth-and-gums mask 704 of FIG. 7B that represents the teeth and gums region.

In some embodiments, a gums region (e.g., represented via a gums mask) may be used to identify a braces region within the gums. In such cases, a teeth-and-gums mask (e.g., teeth-and-gums mask 704 of FIG. 7B) can be analyzed to determine a gums region. For example, a pixel color segmentation may be employed to determine a gums region. In this example, a k-means clustering algorithm may be used to separate the teeth from the gums. Using a sampling color of the teeth (as previously identified) and a gums color (e.g., a mean color of upper region between two teeth and lips), the teeth and gums can be divided into two different sections, one representing teeth color or region and another representing gums color or region. By way of example only, and with reference to FIG. 7C, the teeth and gums are divided into a first section 710 representing teeth color and a second section 712 representing gums color.

Figure 7C:
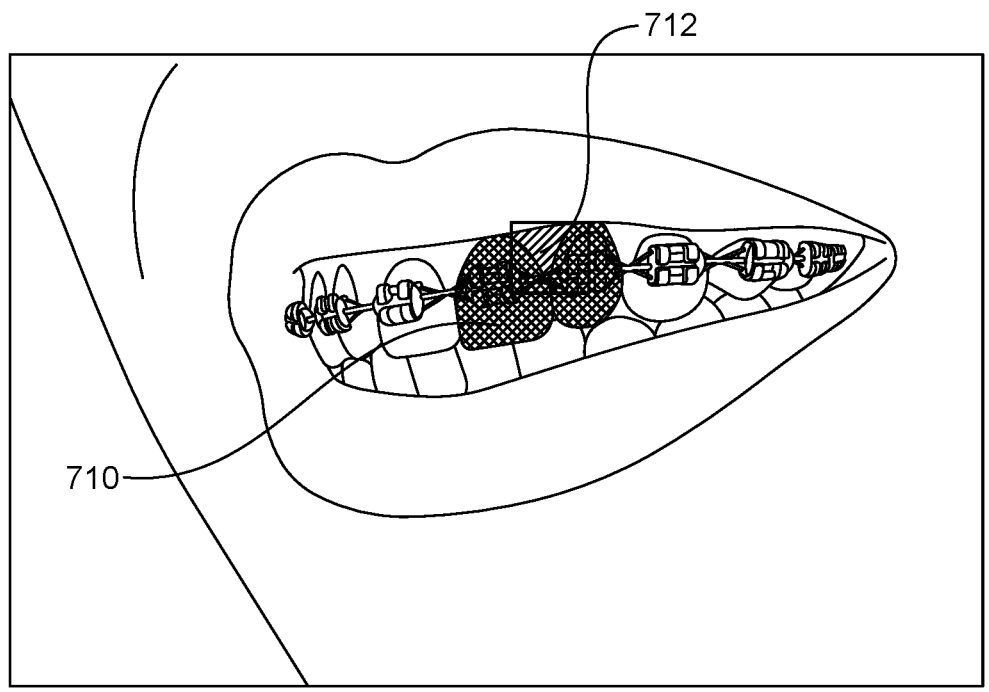
FIG. 7C illustrates an example first section representing a teeth color and a second section representing a gums color, according to embodiments of the present disclosure.
Figure 7D:
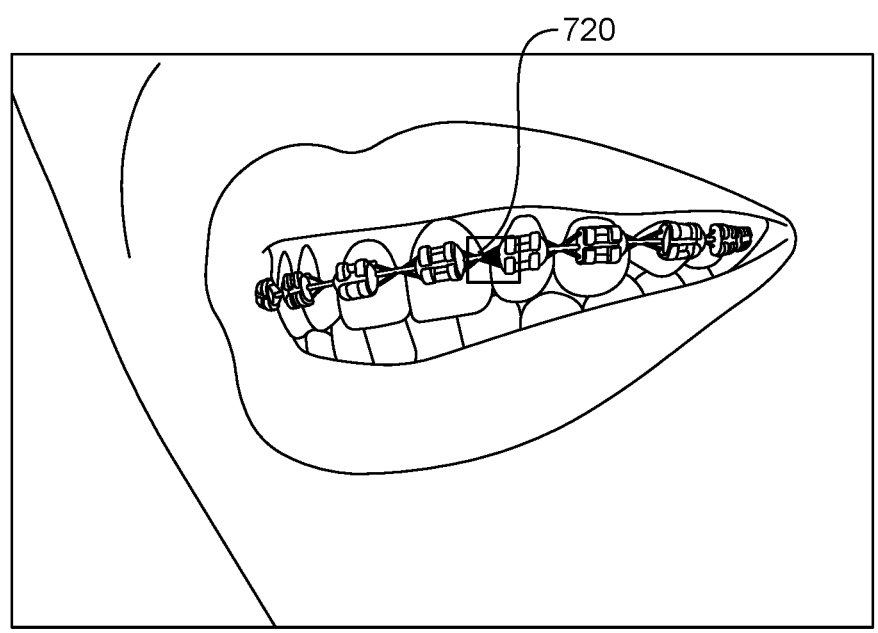
FIG. 7D illustrates an example of a portion of braces over gums, according to embodiments of the present disclosure.

To determine a braces region within the gums, the gums region (e.g., represented via a gums mask, such as second section 712 in FIG. 7C) may be analyzed. In this way, the gums region may be analyzed to identify any portion of braces within the gums region. For example, as illustrated in FIG. 7D, a portion of braces 720 may be identified as overlaying the gums region.

In one implementation, to determine a braces region within the gums, a gums (gingiva) color can be determined. In some cases, a mean gums color can be determined by identifying a mean color of upper region between two teeth and lips. A braces color can also be determined. For example, based on the braces group generated above, a mean color of the pixels in the braces group may be determined. Thereafter, k-means clustering (e.g., k=2, gums mean color and brace mean color) can then be used to identify a pixel cluster, or mask, of a braces region on the gums. K-means clustering generally refers to dividing a region into k number of parts. In this example, the k number of parts may refer to different unique colors to divide the region into a braces region and a gums region. As can be appreciated, other methods may be employed to separate pixels into a braces region and a gums region. For example, using a seed implementation (e.g., as described above) may be employed. Although described as using a gums region or mask to identify braces within the gums region, as can be appreciated, in other implementations a teeth-and-gums region or mask, or a mouth region or mask, may be utilized to identify a gums-braces region associated with the gums.

As can be appreciated, the braces region associated with the teeth region (teeth-braces region) and the braces regions associated with the gums region (gums-braces) can be aggregated together to form a braces region that includes braces portions covering both the teeth and the gums in the image. In this regard, a braces mask can represent visually present braces that appear over the teeth and the gums of an individual(s) in an image.

The braces inpainter 210 is generally configured to remove the region occupied by the braces (the braces region) and fill the empty region (e.g., based on corresponding tooth and/or gums colors). Accordingly, the braces inpainter 210 may remove the determined braces region from the image to create a hole or void (missing areas or values in the image). To fill the empty region, the braces inpainter 210 fills in missing values in the image. For instance, content-aware fill technology can be used to fill missing values using a sampling area associated with a visible portion of the corresponding tooth (e.g., via a teeth region). In particular, content-aware fill technology can be provided with an appropriate sampling area to use for performing filling (e.g., a sampling area from a corresponding tooth to fill a braces portion on that tooth). Using a sampling area associated with a visible portion of the corresponding tooth can ensure that the content-aware fill technology utilizes an appropriate color to fill an area from a same tooth such that the braces region over the teeth is filled with a color that closely matches the corresponding tooth. Similarly, for the gums area for which to fill a portion of the braces region, a gums sampling area can be used for performing filling of the empty region.

Figure 8A:
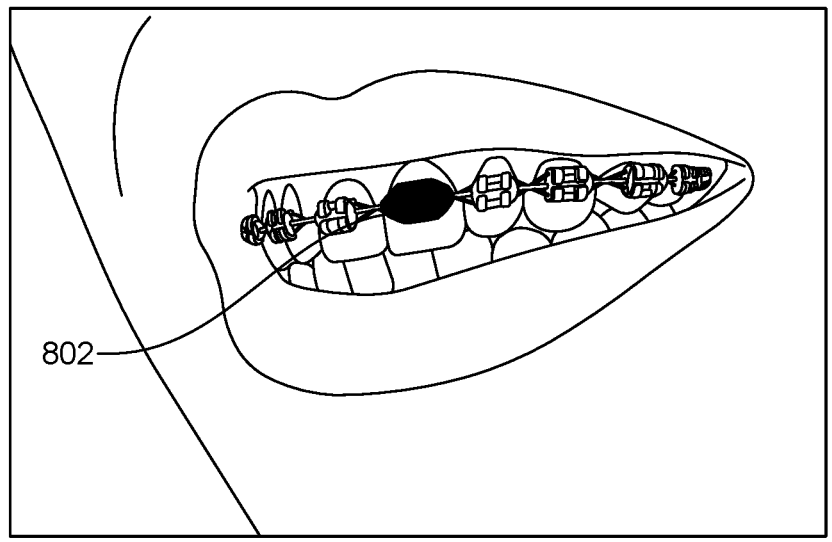
FIG. 8A illustrates an example portion of braces region that is removed from an image, in accordance with embodiments of the present disclosure.
Figure 8B:
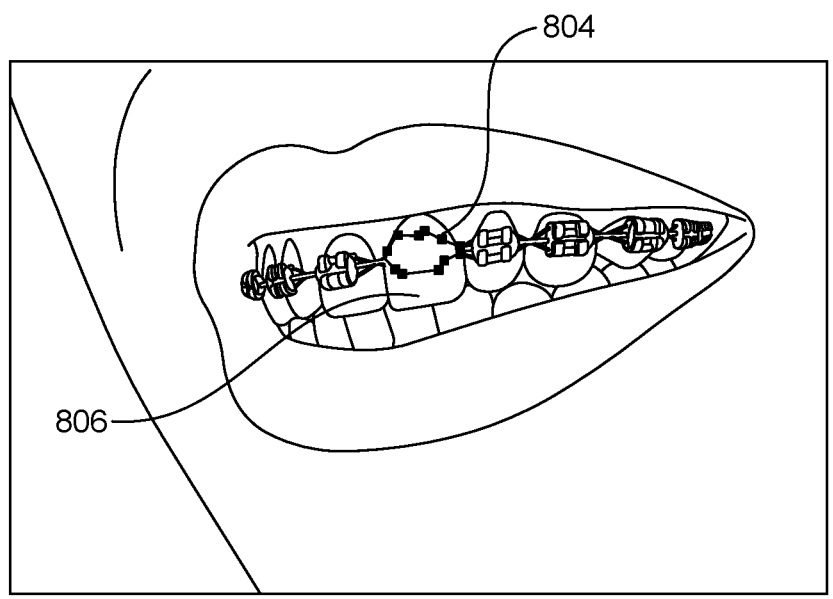
FIG. 8B illustrates an example region filled using a sample color associated with the tooth, in accordance with embodiments of the present disclosure.

By way of example only, FIGS. 8A and 8B illustrate an exemplary performance of braces inpainting. In particular, FIG. 8A illustrates a portion of braces region 802 that is removed from the image. As shown in FIG. 8B, the region 804 is filled using a sample color associated with the tooth, such as sample color 806.

Figure 9A:
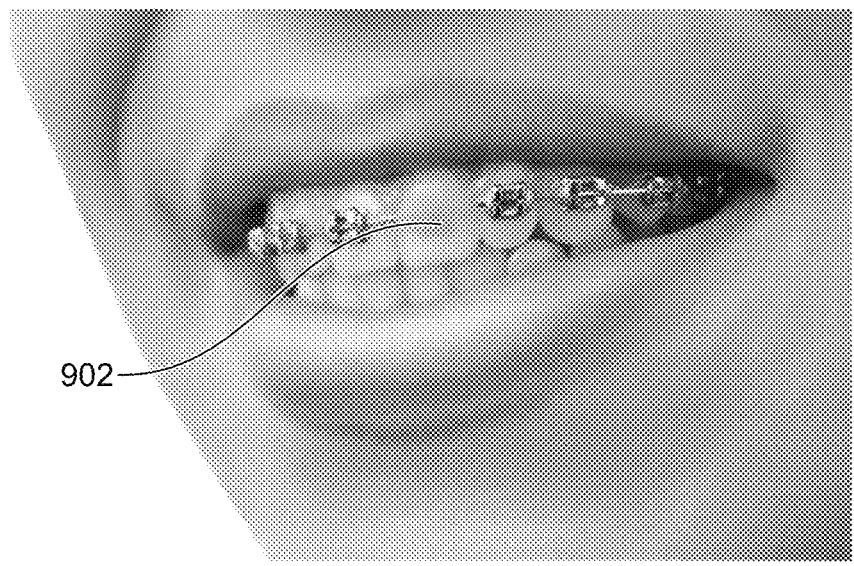
FIG. 9A illustrates an example of color variation on a tooth, in accordance with embodiments of the present disclosure.
Figure 9B:
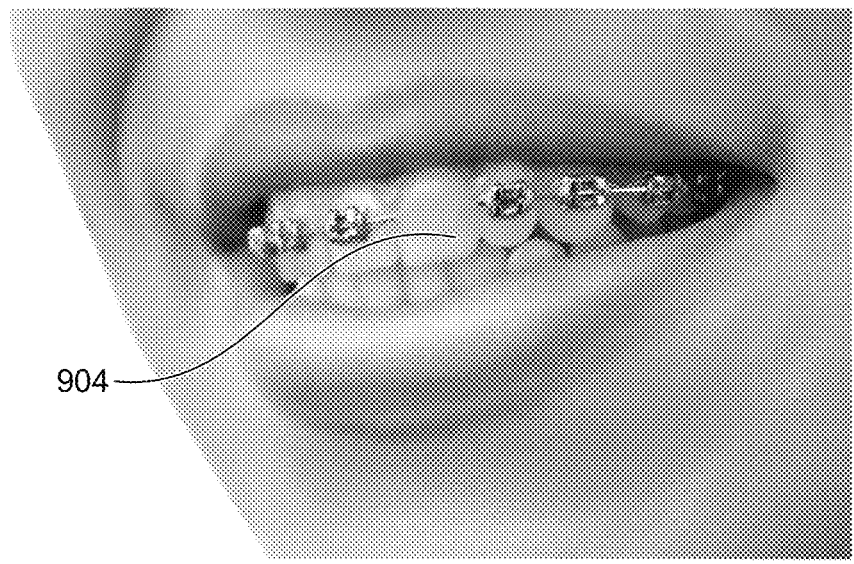
FIG. 9B illustrates an example of smooth color on a tooth upon performing color smoothing, in accordance with embodiments of the present disclosure.

The teeth color manager 212 is generally used to smooth the color after the braces region is removed and filled with color from a sampling area(s). In some cases, the braces region inpainting may cause color variations between the filled-in area and the actual tooth color. As such, the teeth color manager 212 can operate to smooth the teeth region, and/or portions thereof (e.g., a set of teeth in the teeth region). For example, after inpainting, a set of pixels associated with a tooth may have a color differences and a blurring algorithm may be employed to smooth the color of the tooth (or teeth region). Smoothing can be performed by applying a surface blur inside the teeth region to make each tooth appear more realistic after the braces are removed. Such smoothing ensures a smooth color gradient of the filled region associated with the teeth. For example, as shown in FIG. 9A, upon filling the removed braces region 902, color variations on the tooth exist. Upon performing color smoothing, the color of tooth 904 appears smooth and natural, as shown in FIG. 9B.

In some embodiments, the teeth color manager 212 may also perform teeth whitening such that the teeth have a whitening effect. A teeth whitening effect can be applied via a deep degenerative teeth whitening algorithm. One example of a teeth whitening application is generally described in U.S. application Ser. No. 16/391,883, titled "Automatic Teeth Whitening Using Teeth Region Detection and Individual Tooth Location, which is incorporated herein in its entirety.

Figure 10:
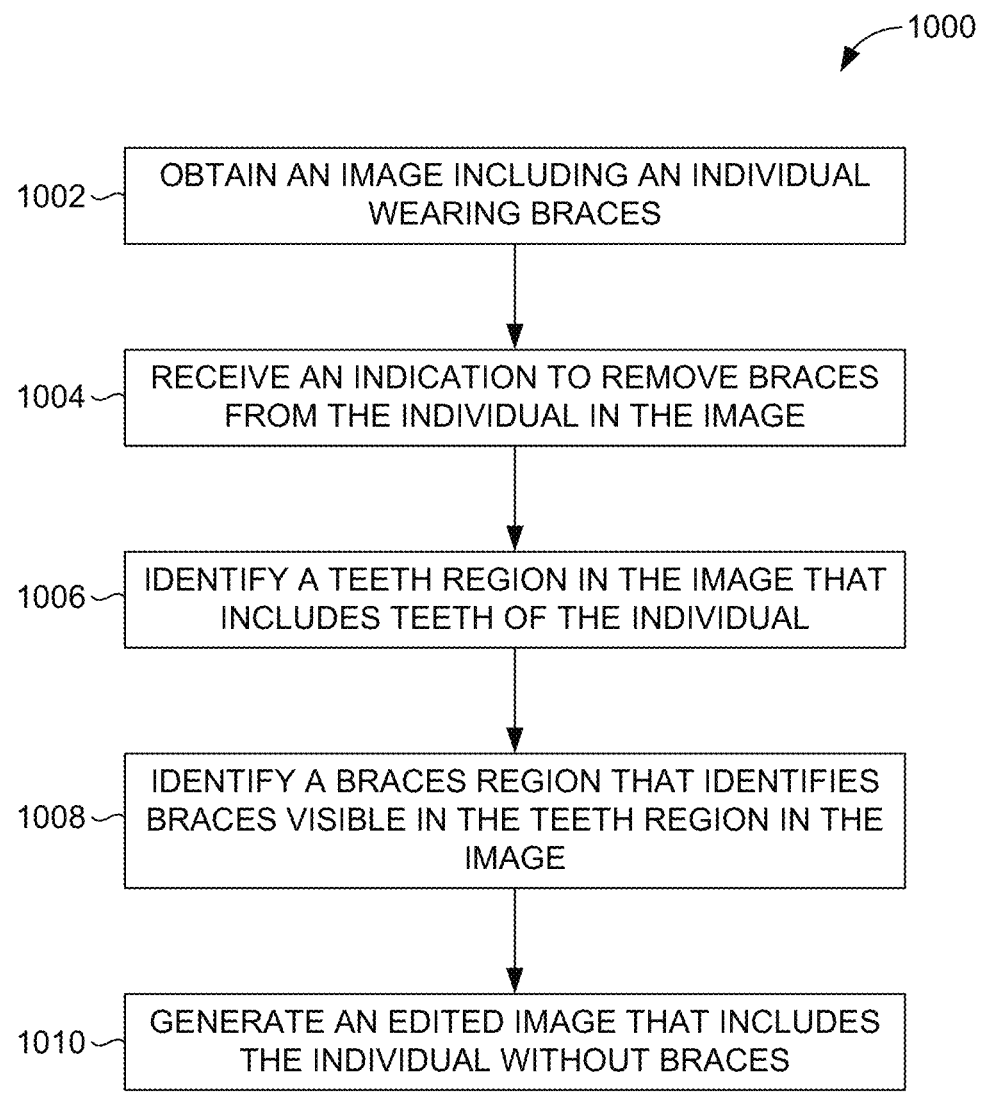
FIG. 10 provides one example of a method for performing automatic braces removal, in accordance with embodiments of the present disclosure.
Figure 11:
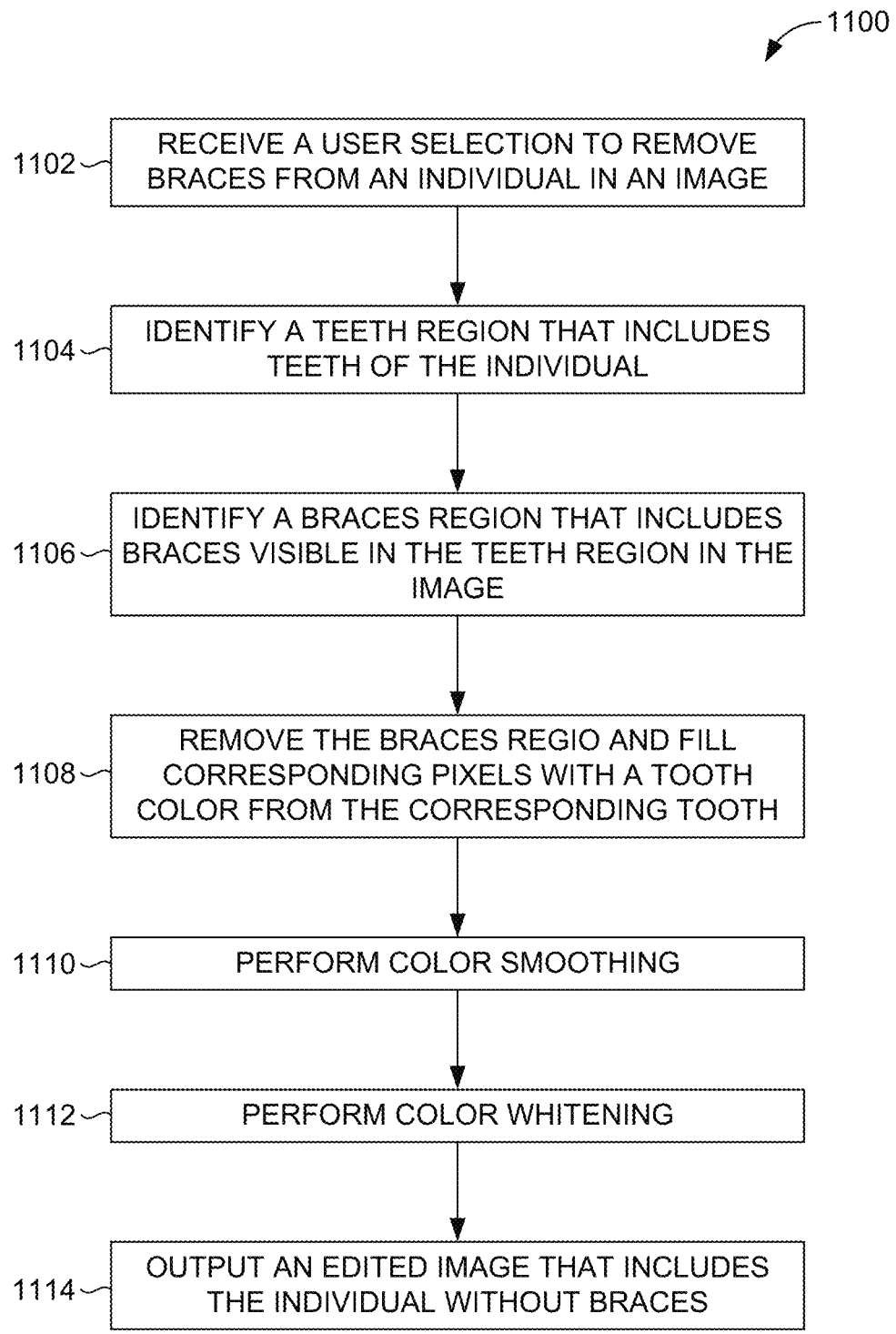
FIG. 11 provides another example of a method for performing automatic braces removal, in accordance with embodiments of the present disclosure.

Turning now to FIGS. 10-11, FIGS. 10-11 provide method flows related to facilitating automated braces removal, in accordance with embodiments of the present technology. Each block of method 1000 and 1100 comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. The method flows of FIGS. 10-11 are exemplary only and not intended to be limiting. As can be appreciated, in some embodiments, method flows 1000-1100 may be implemented, at least in part, in real time to enable automated editing of an image to remove braces in the image.

Turning to FIG. 10, FIG. 10 provides a method 1000 for performing automatic braces removal, in accordance with embodiments of the present disclosure. At block 1002, an image including an individual wearing braces is obtained. At block 1004, an indication to remove the braces from the individual in the image is received. For example, a user may select an icon to provide an indication to remove braces. In other cases, an indication to remove braces may be received based on default setting to remove any detected braces. At block 1006, a teeth region in the image that includes teeth of the individual is identified. A teeth region can be detected in any number of ways, including via a machine learning model trained using images having individuals with braces. At block 1008, a braces region that identifies braces visible in the teeth region in the image is identified. As described herein, a braces region may include braces that cover teeth and braces that cover gums or other non-teeth areas. A braces region can be identified using various approaches for the portions that cover teeth and the portions that cover non-teeth areas. At block 1010, an edited image that includes the individual without braces is generated. In embodiments, generating the edited image includes filling a set of pixels corresponding with the braces region with a tooth color from the teeth region.

With reference to FIG. 11, FIG. 11 provides a method 1100 for performing automatic braces removal, in accordance with embodiments described herein. At block 1102, a user selection is received, via a graphical user interface, to remove braces from an individual in an image. In some cases, a user may also select an individual for which automated braces removal is to apply. At block 1104, based on receiving the user selection to remove the braces, a teeth region is automatically identified in the image that includes teeth of the individual. A teeth region may be identified upon applying a face detection to detect a face and applying a machine learned model to identify the teeth region. At block 1106, a braces region is automatically identified that includes braces visible in the teeth region in the image. A braces region may be identified using a color of a crown portion of a tooth(s). In this regard, generally, pixel colors may be compared to a sample tooth color to identify which portions of the teeth region are braces and which portions are teeth. At block 1108, the braces region is removed and the corresponding pixels are filled with a tooth color from the corresponding tooth. As such, the braces region is filled in with an appropriate tooth color. At block 1110, color smoothing is performed. Color smoothing can be performed to smooth or blur the color of each tooth. At block 1112, color whitening is performed to whiten the teeth. At block 1114, an edited image that includes the individual without braces is output for display.

Figure 12:
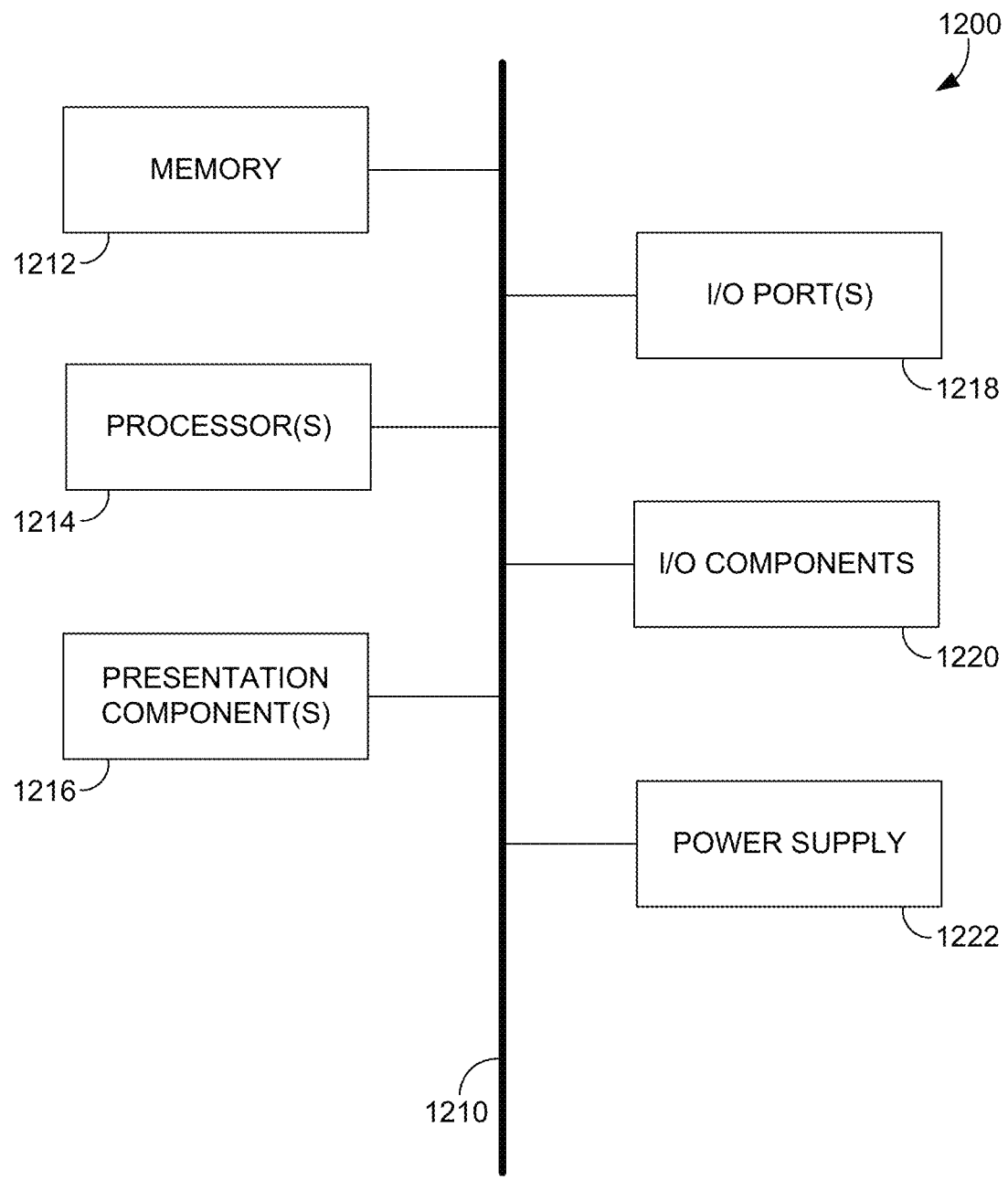
FIG. 12 is a block diagram of an example computing device in which embodiments of the present disclosure may be employed.

Having described embodiments of the present invention, FIG. 12 provides an example of a computing device in which embodiments of the present invention may be employed. Computing device 1200 includes bus 1210 that directly or indirectly couples the following devices: memory 1212, one or more processors 1214, one or more presentation components 1216, input/output (I/O) ports 1218, input/output components 1220, and illustrative power supply 1222. Bus 1210 represents what may be one or more busses (such as an address bus, data bus, or combination thereof). Although the various blocks of FIG. 12 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 12 is merely illustrative of an exemplary computing device that can be used in connection with one or more embodiments of the present invention. Distinction is not made between such categories as "workstation," "server," "laptop," "handheld device," etc., as all are contemplated within the scope of FIG. 10 and reference to "computing device."

Computing device 1200 typically includes a variety of computer-readable media. Computer-readable media can be any available media that can be accessed by computing device 1200 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1200. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 1212 includes computer storage media in the form of volatile and/or nonvolatile memory. As depicted, memory 1212 includes instructions 1224. Instructions 1224, when executed by processor(s) 1214 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 1200 includes one or more processors that read data from various entities such as memory 1212 or I/O components 1220. Presentation component(s) 1216 present data indications to a user or other device. Exemplary presentation components include a display device, speaker, printing component, vibrating component, etc.

I/O ports 1218 allow computing device 1200 to be logically coupled to other devices including I/O components 1220, some of which may be built in. Illustrative components include a microphone, joystick, game pad, satellite dish, scanner, printer, wireless device, etc. I/O components 1220 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 1200. Computing device 1200 may be equipped with depth cameras, such as stereoscopic camera systems, infrared camera systems, RGB camera systems, and combinations of these, for gesture detection and recognition. Additionally, computing device 1200 may be equipped with accelerometers or gyroscopes that enable detection of motion. The output of the accelerometers or gyroscopes may be provided to the display of computing device 1200 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented for removing braces from images, the method comprising:
    obtaining an image including an individual wearing braces;
    receiving an indication to remove the braces from the individual in the image; and
    based on receiving the indication to remove the braces, automatically:
        identifying a teeth region in the image that includes teeth of the individual,
        identifying a braces region that identifies braces visible in the teeth region in the image, and generating an edited image that includes the individual without braces, wherein generating the edited image includes filling a set of pixels corresponding with the braces region with a tooth color from the teeth region.

2. The computer-implemented method of claim 1, wherein the indication to remove the braces is provided by a single selection via a graphical user interface.

3. The computer-implemented method of claim 1, wherein the teeth region is identified via machine learned model trained using images of individuals with braces fully visible and partially visible.

4. The computer-implemented method of claim 1, wherein the braces region that identifies braces visible in the teeth region is identified, in a tooth-by-tooth manner, using a sample color of a corresponding tooth.

5. The computer-implemented method of claim 1, wherein the braces region that identifies braces visible in the teeth region is identified by:
selecting seed pixels within the teeth region;
using the seed pixels to generate blocks of pixels, wherein each block of pixels has a similar color pixel; and
separating the blocks of pixels into a tooth group that includes blocks matching a sample tooth color and a braces group that includes blocks not matching the sample tooth color.

6. The computer-implemented method of claim 1, wherein the braces region further identifies braces visible in the gums region in the image, the braces visible in the gums region identified using k-means clustering.

7. The computer-implemented method of claim 1, wherein generating the edited image further includes smoothing the tooth color.

8. The computer-implemented method of claim 1, wherein pixels associated with a particular tooth in the teeth region is filled with the tooth color of the particular tooth.

9. One or more computer-readable media having a plurality of executable instructions embodied thereon, which, when executed by one or more processors, cause the one or more processors to perform a method for automatically removing braces from images, the method comprising:
receiving a user selection, via a graphical user interface, to remove braces from an individual in an image;
based on receiving the user selection to remove the braces, automatically:
identifying a teeth region in the image that includes teeth of the individual,
identifying a braces region that identifies braces visible in the teeth region in the image, and
generating an edited image that includes the individual without braces, wherein generating the edited image includes, for each tooth in the teeth region, filling a set of pixels corresponding with the braces region with a tooth color from the corresponding tooth; and
causing presentation of the edited image.

10. The media of claim 9 further comprising receiving a user selection of the individual in the image for which braces removal is desired.

11. The media of claim 9 further comprising causing presentation of a braces removal control, via the graphical user interface, that, when selected, initiates an automated braces removal process.

12. The media of claim 9, wherein the braces region that identifies braces visible in the teeth region is identified, in a tooth-by-tooth manner, using a sample color of a corresponding tooth.

13. The media of claim 9, wherein the braces region that identifies braces visible in the teeth region is identified by:
selecting seed pixels within the teeth region;
using the seed pixels to generate blocks of pixels, wherein each block of pixels has a similar color pixel; and
separating the blocks of pixels into a tooth group that includes blocks matching a sample tooth color and a braces group that includes blocks not matching the sample tooth color.

14. The media of claim 9, wherein the braces region further identifies braces visible in the gums region in the image, the braces visible in the gums region identified using k-means clustering.

15. The media of claim 9, wherein generating the edited image further includes smoothing the tooth color and whitening the tooth color.

16. The media of claim 9, wherein the method is performed to concurrently remove braces from a plurality of individuals having braces in the image.

17. A computing system comprising:
one or more processors; and
one or more non-transitory computer-readable storage media, coupled with the one or more processors, having instructions stored thereon, which, when executed by the one or more processors, cause the computing system to provide:
means for receiving a user selection to remove braces from an individual in an image; and
means for automatically generating an edited image that includes the individual without braces, in response to the user selection to remove braces, wherein automatically generating the edited image includes removing a braces region from a set of teeth in the image and filling a set of pixels corresponding with the braces region via a tooth color sampling from a corresponding tooth.

18. The system of claim 17 further comprising means for identifying the braces region.

19. The system of claim 17, further comprising means for identifying a tooth region to use in identifying the braces region.

20. The system of claim 17, wherein the braces region is represented via a braces mask that includes braces appearing a teeth region and braces appearing in a non-teeth region.

* * * * *